US009594657B2

(12) United States Patent
Lee et al.

(10) Patent No.: US 9,594,657 B2
(45) Date of Patent: Mar. 14, 2017

(54) METHOD OF ANALYSING MEMORY USAGE AND USER TERMINAL PERFORMING THE SAME

(71) Applicant: TEEMSTONE, Seoul (KR)

(72) Inventors: Bum Sik Lee, Seongnam-si (KR); Chang Won Seol, Seongnam-si (KR); Ja Heon Ku, Seoul (KR)

(73) Assignee: TEEMSTONE, Seoul (KR)

( * ) Notice: Subject to any disclaimer, the term of this patent is extended or adjusted under 35 U.S.C. 154(b) by 133 days.

(21) Appl. No.: 14/538,895

(22) Filed: Nov. 12, 2014

(65) Prior Publication Data
US 2015/0135020 A1 May 14, 2015

(30) Foreign Application Priority Data

Nov. 11, 2013 (KR) .................. 10-2013-0136565

(51) Int. Cl.
G06F 12/00 (2006.01)
G06F 13/00 (2006.01)
G06F 11/30 (2006.01)
G06F 12/08 (2016.01)
G06F 11/34 (2006.01)
G06F 12/10 (2016.01)

(52) U.S. Cl.
CPC ...... *G06F 11/3037* (2013.01); *G06F 11/3409* (2013.01); *G06F 12/08* (2013.01); *G06F 12/1009* (2013.01); *G06F 2212/1044* (2013.01); *G06F 2212/657* (2013.01)

(58) Field of Classification Search
None
See application file for complete search history.

(56) References Cited

U.S. PATENT DOCUMENTS

| 5,668,944 | A | * | 9/1997 | Berry | G06F 11/34 714/47.2 |
| 6,424,428 | B1 | * | 7/2002 | Takeuchi | G06K 15/02 358/1.16 |
| 7,206,975 | B1 | * | 4/2007 | Wilding | G06F 11/0766 714/47.1 |
| 8,839,263 | B2 | * | 9/2014 | Sugai | G06F 9/45558 718/104 |
| 2002/0016871 | A1 | * | 2/2002 | Graf | G06F 11/0715 710/5 |

(Continued)

FOREIGN PATENT DOCUMENTS

KR 10-2012-0112965 10/2012
KR 10-2013-0046459 5/2013

*Primary Examiner* — Sean D Rossiter
(74) *Attorney, Agent, or Firm* — Paratus Law Group, PLLC

(57) ABSTRACT

This application relates to a method of analyzing the memory usage being performed on a user terminal, the user terminal executing a plurality of application objects and the method includes (a) measuring an active virtual memory (AVM) usage being used in the plurality of application objects, (b) determining a physical memory usage from the active virtual memory when measuring the active virtual memory usage and (c) subtracting the physical memory usage from the measured active virtual memory usage to determine a swap unique memory usage. Therefore, it may be possible to efficiently measure the memory usage used only in the swap memory from the active virtual memory.

12 Claims, 6 Drawing Sheets

(56) References Cited

U.S. PATENT DOCUMENTS

| | | | | |
|---|---|---|---|---|
| 2003/0135382 A1* | 7/2003 | Marejka | ............ | G06F 11/0709 709/232 |
| 2010/0023565 A1* | 1/2010 | Colbert | ............... | G06F 9/4856 711/E12.001 |
| 2010/0058352 A1* | 3/2010 | Esfahany | ............... | G06F 9/505 718/105 |
| 2014/0250439 A1* | 9/2014 | Parashar | ............... | G06F 9/505 718/104 |
| 2014/0317373 A1* | 10/2014 | Kim | ..................... | G06F 11/008 711/167 |
| 2015/0052205 A1* | 2/2015 | Svoboda | ............... | H04L 67/28 709/206 |

* cited by examiner

| PAGE NUMBER | POINTER | FLAG |
|---|---|---|
| 1 | P1 | 1 |
| 2 | P2 | 1 |
| 3 | P3 | 0 |
| 5 | P5 | 1 |
| ⋮ | ⋮ | ⋮ |
| 1023 | P1023 | 0 |
| 1024 | P1024 | 1 |
| ⋮ | ⋮ | ⋮ |
| 4096 | P4096 | 0 |

(a)

| PAGE NUMBER | POINTER | FLAG |
|---|---|---|
| 1 | P1 | 1 |
| 2 | P2 | 1 |
| 5 | P5 | 1 |
| ⋮ | ⋮ | ⋮ |
| 1024 | P1024 | 1 |
| ⋮ | ⋮ | ⋮ |

METHOD OF ANALYSING MEMORY USAGE AND USER TERMINAL PERFORMING THE SAME

CROSS-REFERENCE TO RELATED APPLICATIONS

Pursuant to 35 U.S.C. §119(a), this application claims the benefit of earlier filing date and right of priority to Korean Patent Application No. 10-2013-0136565, filed on Nov. 11, 2013, the contents of which are hereby incorporated by reference herein in their entirety.

BACKGROUND OF THE INVENTION

Field of the Invention

The present invention relates to a technology of analyzing a memory usage and more particularly, to a method of analyzing a memory usage and a user terminal performing the same capable of efficiently measuring the memory usage used only in a swap memory from an active virtual memory.

Background of the Invention

Generally, operating system (OS) may efficiently use a virtual memory to efficiently use a memory of a main memory unit. The operating system may use a hard disk drive (HDD) as a swap memory when an available memory space lacks in the main memory unit so that some data in the memory of the main memory unit may be swapped for the HDD.

The Korean Patent Publication No. 10-2012-0112965 discloses a non-volatile memory device being performed on a data process device including a process having many cores, a data processing device using the volatile memory device as a swap memory and a swap method using the same. The swap method may cause each of the many cores to select a swapped page to rapidly perform a swap procedure and may anticipate a status of the swap memory to adjust a write operation speed of the swap memory.

The Korean Patent Publication No. 10-2013-0046459 discloses a virtualization embedded system and method thereof using a memory compression swap tool that may compress some of auxiliary memory data to secure available memory when a memory of a main virtual machine is insufficient. The virtualization embedded system may achieve a rapid response and a memory saving and may apply a subminiature embedded equipment that it is not easy to install a hardware swap device.

SUMMARY OF THE INVENTION

Example embodiments of the present invention propose a method of analyzing a memory usage capable of efficiently measuring a memory usage used only in a swap memory from an active virtual memory.

Example embodiments of the present invention propose a method of analyzing a memory usage capable of measuring a memory usage used only in a swap memory each specific time to adjust the memory usage.

Example embodiments of the present invention propose a method of analyzing a memory usage capable of variably determining a maximum swap usage based on a number of application program accepted in hardware.

In some embodiments, a method of analyzing the memory usage being performed on a user terminal, the user terminal executing a plurality of application objects, the method includes (a) measuring an active virtual memory (AVM) usage being used in the plurality of application objects, (b) determining a physical memory usage from the active virtual memory when measuring the active virtual memory usage, and (c) subtracting the physical memory usage from the measured active virtual memory usage to determine a swap unique memory usage.

In one embodiment, the step (a) may include performing a snap shot calculation for a page table of a virtual memory (VM) to generate a snap shot memory table and counting a number of used pages from the snap shot memory table.

The step (a) may further include measuring the active virtual memory usage based on the number of used pages and a size of a corresponding page.

The page table may include a page number, a pointer for the swap memory and a flag indicating whether the virtual memory is used by the plurality of application objects.

In one embodiment, the step (b) may further include determining a reserved swap memory usage from the measured active virtual memory usage, the reserved swap memory being used both for the physical memory and swap memory.

The step (b) may further include subtracting the swap unique memory usage from the swap memory usage to determine the reserved swap memory usage.

In one embodiment, the method may further include (c) checking whether the swap unique memory usage is in a swap acceptance range.

The step (c) may include determining a swap acceptance reference value based on a number of the plurality of application objects to determine the swap acceptance range based on the swap acceptance reference value.

The swap acceptance reference value may become greater as the number of the plurality of application objects becomes greater, and smaller as the number of the plurality of application objects becomes smaller.

In one embodiment, the method may further include (d) displaying the active virtual memory usage, the physical memory usage, the used swap memory usage and the swap unique memory usage.

The step (d) may further include generating an alarm badge at a specific position of the displayed swap unique memory usage when the swap unique memory usage is not in the swap acceptance range.

In some embodiments, there is provided a user terminal, the user terminal includes an active virtual memory usage measuring unit configured to measure an active virtual memory (AVM) usage being used in the plurality of application objects, and a memory usage determining unit configured to determine a physical memory usage from the active virtual memory when measuring the active virtual memory usage and to subtract the physical memory usage from the measured active virtual memory usage to determine the swap unique memory usage.

In one embodiment, the user terminal may further include a swap acceptance range checking unit configured to check whether a swap unique memory usage is in a swap acceptance range.

The user terminal may further include a memory usage displaying unit configured to display the used active virtual memory usage, the physical memory usage, the swap memory usage and the swap unique memory usage.

The method of analyzing a memory usage according to an embodiment of the present invention may efficiently measure a memory usage used only in a swap memory from an active virtual memory.

The method of analyzing a memory usage according to an embodiment of the present invention may measure a memory usage used only in a swap memory each specific time.

The method of analyzing a memory usage according to an embodiment of the present invention may variably determine a maximum swap usage based on a numb er of application programs accepted in hardware.

BRIEF DESCRIPTION OF THE DRAWINGS

FIG. 4 is a diagram illustrating a page table of a virtual memory and a page table of an active virtual memory being generated in the user terminal in FIG. 1.

DETAILED DESCRIPTION OF THE EMBODIMENTS

Figure 1:
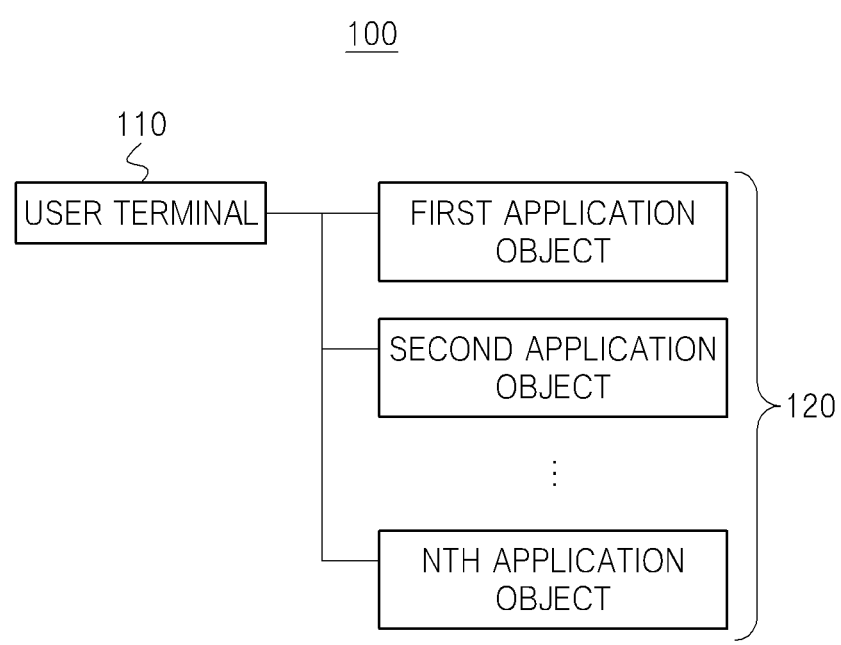
FIG. 1 is a block diagram illustrating a connection between a plurality of application objects and a user terminal in order to analyze a memory usage according to an example embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used to distinguish one component from another. For example, a first component may be referred to as a second component without departing from the scope of rights of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

The terms used in the present application are merely used to describe particular embodiments, and are not intended to limit the present invention. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a block diagram illustrating a connection between a user terminal and a plurality of application objects in order to analyze a memory usage according to an example embodiment of the present invention.

Referring to FIG. 1, a memory usage analysis system 100 includes a user terminal 110 and an application object 120.

The user terminal 110 may include an operating system formed of a plurality of application objects 120. Herein, the user terminal 110 may be connected to each of the plurality of application objects 120 to perform at least one program being executed in each of the plurality of application objects 120.

In one embodiment, the user terminal 110 may be a computing device being operated by a user and may correspond to a desktop computer, a laptop computer or a tablet personal computer.

The application object 120 may be implemented as a plurality of application programs in the user terminal 110. For example, the application program 120 may include at least one of a word processor writing and editing documents, a spread sheet precisely and quickly processing a tables (sheets) calculation, a graphic software drawing pictures, a database program efficiently processing a plurality of data and a communication program transmitting and receiving data and searching for needed data.

In one embodiment, the application object 120 may be implemented as a code region storing program codes, a data region storing global variables and static variables and a stack region storing local variables and parameters.

Figure 2:
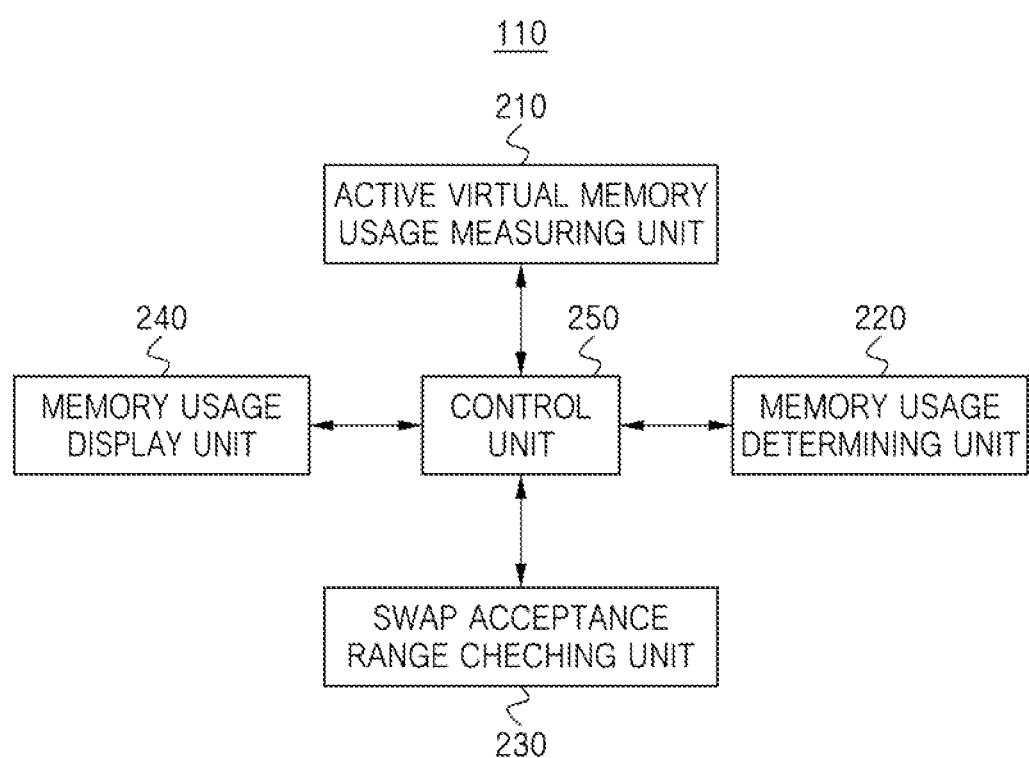
FIG. 2 is a block diagram illustrating a memory usage analysis server of the user terminal in FIG. 1.

FIG. 2 is a block diagram illustrating a memory usage analysis server of the user terminal in FIG. 1.

Referring to FIG. 2, a memory usage analysis server being performed on the user terminal 110 includes an active virtual memory usage measuring unit 210, a memory usage determining unit 220, a swap acceptance range checking unit 230, a memory usage displaying unit 240 and a control unit 250.

The active virtual memory usage measuring unit 210 measures an active virtual memory (AVM) usage being used in the plurality of application objects 120. Herein, the active virtual memory is an active virtual memory being currently used and may exist only in a physical memory region or both in the physical memory region and a swap memory region.

The active virtual memory usage measuring unit 210 performs a snap shot calculation for a page table of a virtual memory (VM) to generate a snap shot memory table and to count a number of pages being used from the snap shot memory table. Herein, the virtual memory may be implemented as RAM and hard disk drive (HDD). For example, the snap shot calculation may be implemented as a logical calculation produced by instantaneously shooting a current virtual memory usage and the snap shot memory table may store a page table of at least one virtual memory generated through the snap shot calculation by time.

In one embodiment, the active virtual memory usage measuring unit 210 may variably set snap a shot calculation time according to a number of the plurality of application objects 120. For example, the snap shot calculation time may become short when the number of the plurality of application objects 120 becomes greater and longer when the number of the plurality of application objects 120 becomes smaller.

The active virtual memory usage measuring unit 210 may store a page table of a specific virtual memory in the snap shot memory table and delete the page table of the specific virtual memory stored in the snap shot memory table after a certain time. Herein, the active virtual memory usage measuring unit 210 may delete the page table of the specific virtual memory after a certain time so that the snap shot memory may be efficiently used.

In one embodiment, the page table of the virtual memory may include a page number, a pointer for the swap memory and a flag indicating whether the virtual memory is used by the plurality of application objects 120.

The active virtual memory usage measuring unit 210 may determine a number of current used pages based on the page table of the virtual memory stored in the snap shot memory table and measure the active virtual memory usage based on the number of currently used pages and a size of corresponding page.

In one embodiment, the active virtual memory usage measuring unit 210 may determine a number of pages in case where the flag is [1] (i.e., a number of page table records of the virtual memory stored in the snap shot memory table) based on the page table of the virtual memory stored in the snap shot memory table and may calculate the page size of the page table of the virtual memory (i.e., a memory size assigned to one record). The active virtual memory usage measuring unit 210 may perform an arithmetic operation for the number and size of the pages to measure the active virtual memory usage. For example, the arithmetic operation may be implemented as a multiplying operation between the number and the size of the pages.

The memory usage determining unit 220 determines a physical memory usage from the active virtual memory instant of measuring the active virtual memory usage. The physical memory is a memory substantially installed in hardware and may be implemented as a random access memory (RAM).

The memory usage determining unit 220 subtracts the physical memory usage from the active virtual memory usage to determine the swap unique memory usage. The swap unique memory usage is a usage of a memory existing only in the swap memory region and is an indicator deciding a potential danger of a performance degradation caused by insufficient memory. For example, the memory usage determining unit 220 may calculate the swap unique memory usage as 1.3 GB when the active virtual memory usage is 3 GB (Giga Byte) and the physical memory usage is 1.7 GB.

The memory usage determining unit 220 may determine a reserved swap memory usage being used both for the physical memory and the swap memory from the active virtual memory usage being used in the plurality of application objects 120. For example, the memory usage determining unit 220 may subtract the swap unique memory usage from the swap memory usage to determine the reserved swap memory usage. For another example, the memory usage determining unit 220 may determine the reserved swap memory usage based on the physical memory usage and swap memory usage.

In one embodiment, the memory usage determining unit 220 may respectively measure the physical memory usage and swap memory usage among the active virtual memory usage before determining the swap unique memory usage. For example, when the active virtual memory usage is 2 GB, the memory usage determining unit 220 may measure the physical memory usage as 1.7 GB and the swap memory usage as 0.8 GB. Herein, the reserved swap memory usage corresponds to 0.5 GB.

The swap acceptance range checking unit 230 checks whether the swap unique memory usage is within the swap acceptance range. Herein, the swap acceptance range may be variably determined according to the number of the plurality of application objects 120.

In one embodiment, the swap acceptance range checking unit 230 may determine a swap acceptance reference value based on the number of the plurality of application objects 120 to determine a swap acceptance range based on the swap acceptance reference value. The swap acceptance reference value may be set to be greater as the number of the plurality of application objects 120 becomes greater and smaller as the number of the plurality of application objects 120 becomes smaller. For example, when the swap acceptance reference value is 0.5 GB, the swap acceptance range may be determined to have a tolerance of 0.1 GB from the swap acceptance reference value. That is, the swap acceptance range may be determined to be 0.4 GB~0.6 GB.

The memory usage displaying unit 250 displays the active virtual memory usage, the physical memory usage, the swap memory usage and the swap unique memory usage.

In one embodiment, the memory usage displaying unit 250 may display the active virtual memory usage, the physical memory usage, the swap memory usage and the swap unique memory usage with a bar graph, each being measured at a specific time. Herein, the bar graph displaying the memory usage displaying unit 250 is used for conveniences' sake an example embodiment but should not to limit a scope of the present invention. Also, the display type may be determined by a user's setting (not shown) such as a linear graph or a circular graph, etc.

The memory usage displaying unit 250 may generate an alarm badge at a specific position of a swap unique memory usage displayed when the swap unique memory usage is not in the swap acceptance range.

In one embodiment, the memory usage displaying unit 250 may generate a specific effect (not shown) (for example, twinkle, fluorescent color, etc.) at a portion where the swap unique memory usage not being in the swap acceptance range is displayed.

The control unit 250 may control an overall operation of the memory usage analysis server and may control a control flow or a data flow among the active virtual memory usage measuring unit 210, the memory usage determining unit 220, the swap acceptance range checking unit 230 and the memory usage displaying unit 240.

Figure 3:
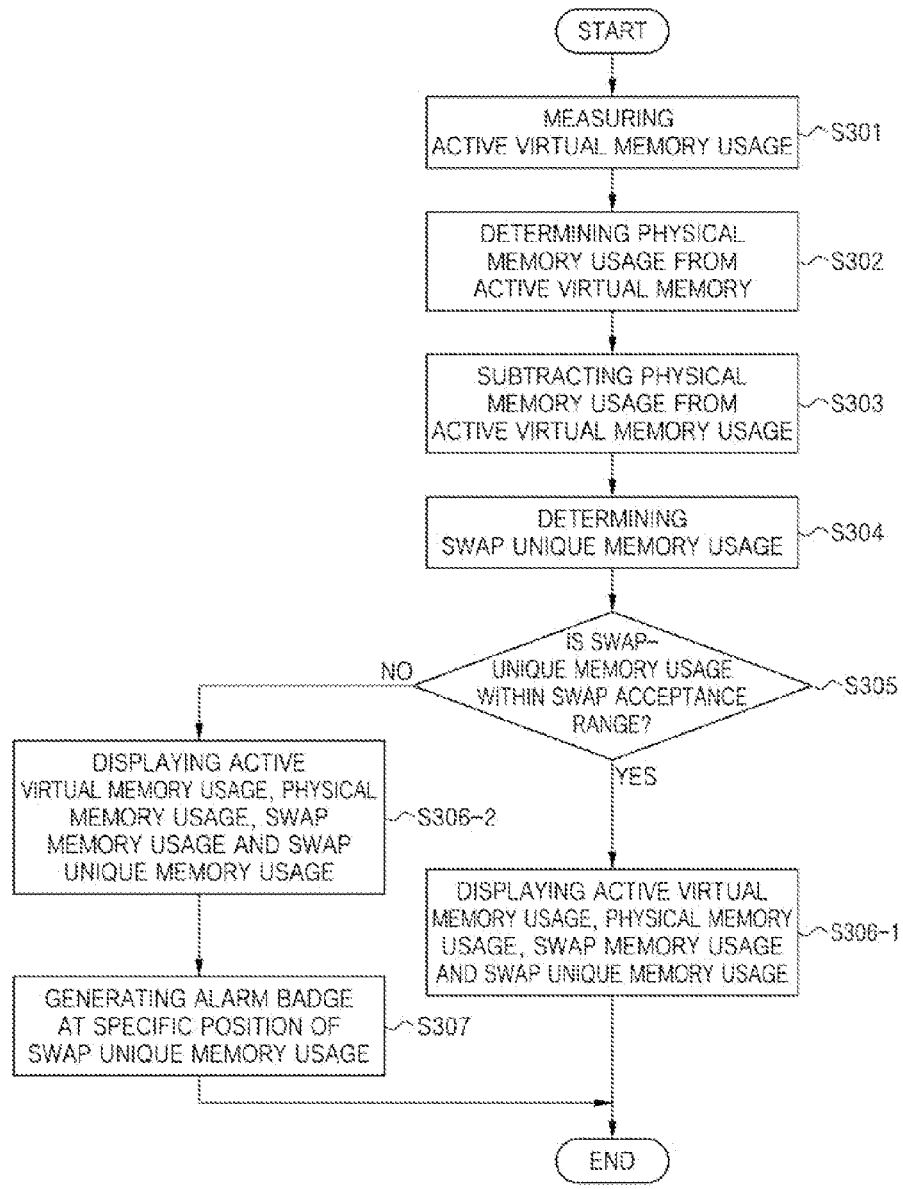
FIG. 3 is a flow chart illustrating a memory usage analysis procedure performed on the user terminal in FIG. 1.

FIG. 3 is a flow chart illustrating a memory usage analysis procedure performed on the user terminal in FIG. 1.

Referring to FIG. 3, the active virtual memory usage measuring unit 210 measures the active virtual memory (AVM) usage being used in the plurality of application objects 120 (Step S301).

In one embodiment, the active virtual memory usage measuring unit 210 may perform the snapshot calculation for the page table of the virtual memory(VM) to generate the snapshot memory table and to count the number of pages being used from the snapshot memory table. Herein, the page table of the virtual memory may include the page number, the pointer for the swap memory and the flag indicating whether the virtual memory is used by the plurality of application objects 120.

The active virtual memory usage measuring unit 210 may determine the number of current used pages based on the page table of the virtual memory stored in the snapshot memory table and may measure the active virtual memory usage based on the number of the current used pages and the size of the corresponding pages.

Referring to FIG. 4a, the page table of the virtual memory may include a plurality of page numbers (1, 2, 3, 5, . . . , 1023, 1024, . . . , 4096) included in each of the plurality of application objects, pointers (P1, P2, P3, P5, . . . , P1023, P1024, . . . , P4096) pointing starting addresses for swap memory and a flag (0 or 1) indicating whether the memory for a corresponding page number is used by the plurality of application objects 120. Herein, when the flag is 0, the active virtual memory usage measuring unit 210 may determine that the memory for a corresponding page number is not used by the plurality of application objects 120 and when the flag is 1, may determine that the memory for the corresponding page number is used by the plurality of application objects 120.

Referring to FIG. 4b, the active virtual memory usage measuring unit 210 may store a record whose a flag corresponds to [1] in a page table of a separate active virtual memory based on the page table of the virtual memory stored in the snapshot memory table. For example, the page table of the active virtual memory may store a record corresponding to the page numbers [1, 2, 5, . . . , 1024].

The memory usage determining unit 220 determines a physical memory usage from the active virtual memory instant of measuring the active virtual memory usage (Step S302).

The memory usage determining unit 220 subtracts the physical memory usage from the active virtual memory usage to determine the swap unique memory usage (Steps S303 and S304).

The swap acceptance range checking unit 230 checks whether the swap unique memory usage is in the swap acceptance range (Step S305). Herein, the swap acceptance range may be variably determined based on the number of the plurality of application objects 120.

In one embodiment, the swap acceptance range checking unit 230 may determine the swap acceptance reference value based on the number of the plurality of application objects 120 to determine the swap acceptance range based on the swap acceptance reference value.

Figure 5:
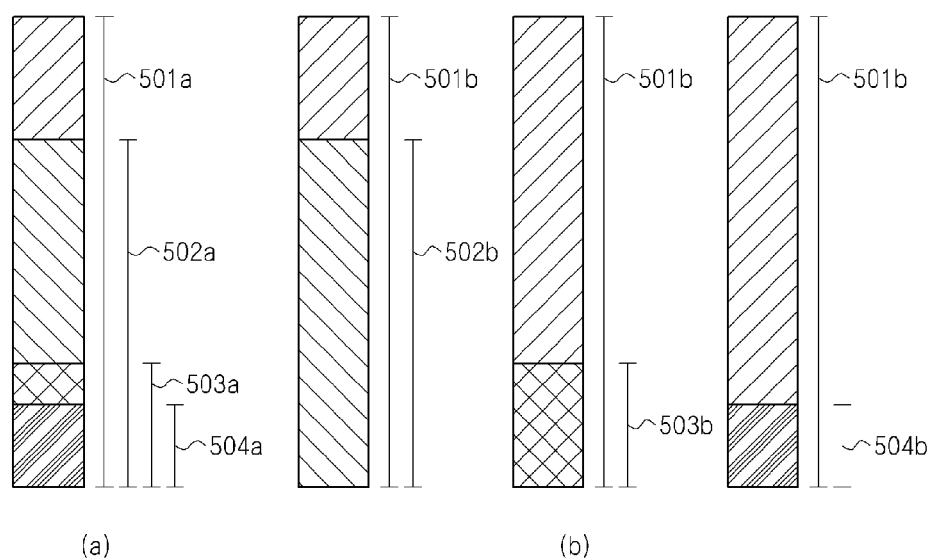
FIG. 5 is a diagram illustrating a memory usage displayed on the user terminal in FIG. 1.

The memory usage displaying unit 250 displays the active virtual memory usage, the physical memory usage, the swap memory usage and the swap unique memory usage when the swap unique memory usage exists in the swap acceptance range (Step S306-1). Referring to FIG. 5a, for example, the memory usage displaying unit 250 may sequentially overlap an active virtual memory usage 501a, a physical memory usage 502a, a swap memory usage 503a and a swap unique memory usage 504a so that those are displayed with another pattern of a bar graph. Referring to FIG. 5b, for another example, the memory usage displaying unit 250 may display an active virtual memory usage 501b and a physical memory usage 502b, may display the active virtual memory usage 501b and a swap memory usage 503b and may display the active virtual memory usage 501b and a swap unique memory usage 504b so that those are displayed with another pattern in a form of bar graph.

Figure 6:
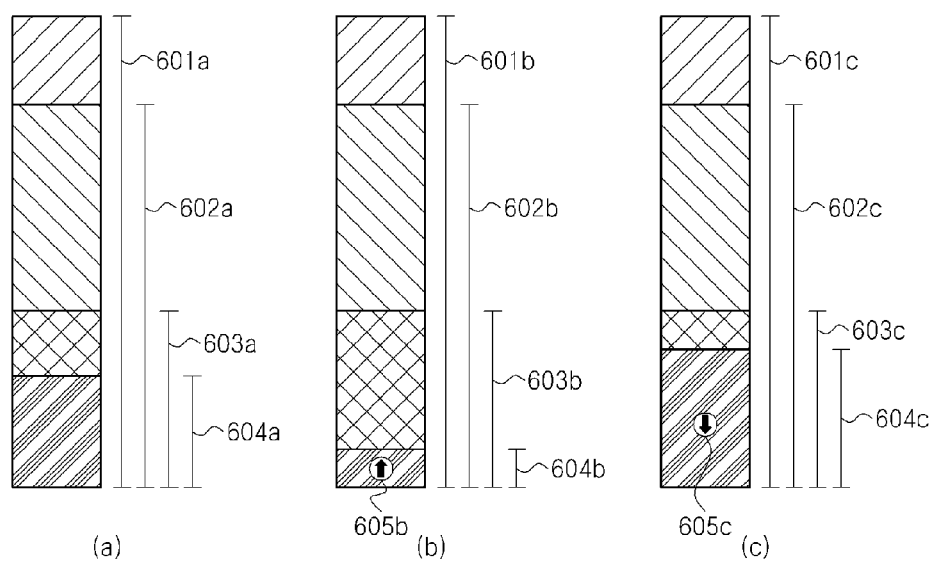
FIG. 6 is a diagram illustrating an alarm badge based on a swap unique memory usage displayed on the user terminal in FIG. 1.

When the swap unique memory usage does not exist in the swap acceptance range, the memory usage displaying unit 250 displays the active virtual memory usage, the physical memory usage, the swap memory usage and the swap unique memory usage and generates an alarm badge at a specific position of the swap unique memory usage (Steps S306-2 and S307). For example, FIG. 6a are examples illustrating display a swap unique memory usage 604a in a swap acceptance range, an active virtual memory usage 601a, a physical memory usage 602a and a swap memory usage 603a, and FIGS. 6b and 6c are examples illustrating display a swap unique memory usage 604b and 604c not in the swap acceptance range and the active virtual memory usage 601b and 601c, and the physical memory usage 602b and 602c and the swap memory usage 603b and 603c. Herein, the memory usage displaying unit 250 may generate an upward arrow alarm badge 605b in a middle portion of the swap unique memory usage 604b in a region under the swap acceptance range and a downward arrow alarm badge 605c in a middle portion of the swap unique memory usage 604c in a region exceeding the swap acceptance range.

Although this document provides descriptions of preferred embodiments of the present invention, it would be understood by those skilled in the art that the present invention can be modified or changed in various ways without departing from the technical principles and scope defined by the appended claims.

DESCRIPTION OF SYMBOLS

100: MEMORY USAGE ANALYZING SYSTEM
110: USER TERMINAL
120: APPLICATOIN OBJECT
210: ACTIVE VIRTUAL MEMORY USAGE MEASURING UNIT
220: MEMORY USAGE DETERMINING UNIT
230: SWAP ACCEPTANCE RANGE CHECKING UNIT
240: MEMORY USAGE DISPLAYING UNIT
250: CONTROL UNIT

What is claimed is:

1. A method of analyzing the memory usage being performed on a user terminal, the user terminal executing a plurality of application objects, the method comprising:
measuring an active virtual memory (AVM) usage being used in the plurality of application objects;
determining a physical memory usage from the active virtual memory when measuring the active virtual memory usage;
subtracting the physical memory usage from the measured active virtual memory usage to determine a swap unique memory usage existing in a swap memory region and which indicates a potential danger of a performance degradation; and displaying the active virtual memory usage, the physical memory usage, and the swap unique memory usage.

2. The method of analyzing the memory usage being performed on the user terminal according to claim 1, further comprising:

performing a snap shot calculation for a page table of a virtual memory (VM) to generate a snap shot memory table; and counting a number of used pages from the snap shot memory table.

3. The method of analyzing the memory usage being performed on the user terminal according to claim 2, further comprising:

measuring the active virtual memory usage based on the number of used pages and a size of a corresponding page.

4. The method of analyzing the memory usage being performed on the user terminal according to claim 2, wherein the page table includes a page number, a pointer for the swap memory and a flag indicating whether the virtual memory is used by the plurality of application objects.

5. The method of analyzing the memory usage being performed on the user terminal according to claim 1, further comprising:

determining a reserved swap memory usage from the measured active virtual memory usage, the reserved swap memory being used both for the physical memory and for the swap memory.

6. The method of analyzing the memory usage being performed on the user terminal according to claim 5, further comprising:

subtracting the swap unique memory usage from a swap memory usage to determine the reserved swap memory usage.

7. The method of analyzing the memory usage being performed on the user terminal according to claim 1, further comprising:

determining a swap acceptance reference value based on a number of the plurality of application objects; and determining a swap acceptance range based on the swap acceptance reference value.

8. The method of analyzing the memory usage being performed on the user terminal according to claim 7, further comprising:

checking whether the swap unique memory usage is in the swap acceptance range.

9. The method of analyzing the memory usage being performed on the user terminal according to claim 7, wherein the swap acceptance reference value becomes greater as the number of the plurality of application objects becomes greater, and becomes smaller as the number of the plurality of application objects becomes smaller.

10. The method of analyzing the memory usage being performed on the user terminal according to claim 8, further comprising:

generating an alarm badge at a specific position of the displayed swap unique memory usage when the swap unique memory usage is not in the swap acceptance range.

11. A user terminal executing a plurality of application objects, the user terminal comprising:

an active virtual memory usage measuring unit configured to measure an active virtual memory (AVM) usage being used in the plurality of application objects;

a memory usage determining unit configured to determine a physical memory usage from the active virtual memory when measuring the active virtual memory usage and to subtract the physical memory usage from the measured active virtual memory usage to determine the swap unique memory usage existing in a swap memory region and which indicates a potential danger of a performance degradation; and a memory usage displaying unit configured to display the active virtual memory usage, the physical memory usage, and the swap unique memory usage.

12. The user terminal of claim 11, further comprising:

a swap acceptance range checking unit configured to check whether the swap unique memory usage is in a swap acceptance range.

* * * * *